(12) United States Patent
Lu et al.

(10) Patent No.: US 11,256,023 B2
(45) Date of Patent: Feb. 22, 2022

(54) LIGHT WAVE-GUIDE OPTICAL ELEMENT AND METHOD FOR FORMING THE SAME

(71) Applicant: HIMAX TECHNOLOGIES LIMITED, Tainan (TW)

(72) Inventors: Yin-Dong Lu, Tainan (TW); Han-Yi Kuo, Tainan (TW); Han-Ching Lin, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 164 days.

(21) Appl. No.: 15/796,850

(22) Filed: Oct. 29, 2017

(65) Prior Publication Data

US 2019/0129088 A1    May 2, 2019

(51) Int. Cl.
| | | |
|---|---|---|
| G02B 1/115 | (2015.01) |
| F21V 8/00 | (2006.01) |
| B29D 11/00 | (2006.01) |
| G02B 27/01 | (2006.01) |
| G02B 1/04 | (2006.01) |
| B29K 63/00 | (2006.01) |

(52) U.S. Cl.
CPC ...... *G02B 6/0065* (2013.01); *B29D 11/00663* (2013.01); *B29D 11/00865* (2013.01); *G02B 1/115* (2013.01); *G02B 6/0038* (2013.01); *G02B 27/0101* (2013.01); *B29K 2063/00* (2013.01); *B29K 2995/0018* (2013.01); *G02B 1/045* (2013.01); *G02B 6/0016* (2013.01); *G02B 2027/0125* (2013.01)

(58) Field of Classification Search
CPC ........ B29D 11/00663; B29D 11/00865; B29D 11/0073; B29D 11/00; G02B 1/115; G02B 27/0101; G02B 6/0038; G02B 6/0065; G02B 1/045; G02B 2027/0125; G02B 6/0016; G02B 1/04; G02B 27/01; B29K 2063/00; B29K 2995/0018; F21V 8/00
See application file for complete search history.

(56) References Cited

U.S. PATENT DOCUMENTS

| | | | | |
|---|---|---|---|---|
| 5,126,882 A * | 6/1992 | Oe | ........................ | G02B 6/0068 359/619 |
| 5,727,107 A * | 3/1998 | Umemoto | ............ | G02B 6/0056 385/116 |
| 6,199,995 B1 * | 3/2001 | Umemoto | ............ | G02B 6/0038 362/619 |
| 6,354,709 B1 * | 3/2002 | Campbell | ............... | G02B 5/045 359/837 |
| 6,474,826 B1 * | 11/2002 | Tanaka | .................. | G02B 6/0038 362/612 |

(Continued)

FOREIGN PATENT DOCUMENTS

WO    2011/121949 A1    10/2011

*Primary Examiner* — Balram T Parbadia
(74) *Attorney, Agent, or Firm* — Winston Hsu

(57) ABSTRACT

A light wave-guide optical element for use in a head-mounted display (HMD) or in a head-up display (HUD) includes an organic optical material, an anti-reflection stack and an organic optical cover. The organic optical material includes multiple bulging tips surrounded by a periphery plane. The anti-reflection stack conformally covers the bulging tips and the periphery plane. The organic optical cover correspondingly covers the anti-reflection stack, the periphery plane and the bulging tips.

7 Claims, 23 Drawing Sheets

(56) References Cited

U.S. PATENT DOCUMENTS

| | | | | |
|---|---|---|---|---|
| 6,576,887 B2 * | 6/2003 | Whitney | G02B 6/0065 | 250/227.11 |
| 7,206,040 B2 * | 4/2007 | Kano | G02B 6/0028 | 349/67 |
| 7,991,257 B1 * | 8/2011 | Coleman | G02B 6/0065 | 385/129 |
| 8,665,178 B1 * | 3/2014 | Wang | G02B 27/0172 | 345/8 |
| 2001/0035927 A1 * | 11/2001 | Sasagawa | G02B 6/0036 | 349/113 |
| 2002/0181224 A1 * | 12/2002 | Tahara | G02B 6/0065 | 362/616 |
| 2003/0214719 A1 * | 11/2003 | Bourdelais | G02B 5/0284 | 359/599 |
| 2004/0095621 A1 | 5/2004 | Funada | | |
| 2004/0190102 A1 * | 9/2004 | Mullen | B29D 11/00605 | 359/237 |
| 2005/0141243 A1 * | 6/2005 | Mullen | B29D 11/00 | 362/600 |
| 2005/0163977 A1 * | 7/2005 | Miyatake | G02B 1/111 | 428/195.1 |
| 2006/0176556 A1 * | 8/2006 | Kuo | G03B 21/62 | 359/460 |
| 2006/0270773 A1 * | 11/2006 | Hale | C08L 69/00 | 524/423 |
| 2010/0139749 A1 * | 6/2010 | Mapel | H01L 31/0547 | 136/255 |
| 2010/0139769 A1 * | 6/2010 | Mapel | H01L 31/0547 | 136/259 |
| 2011/0170184 A1 * | 7/2011 | Wolk | G02B 30/27 | 359/463 |
| 2012/0127757 A1 * | 5/2012 | Konokawa | C08F 220/14 | 362/612 |
| 2012/0294037 A1 * | 11/2012 | Holman | G02B 6/0028 | 362/609 |
| 2015/0309228 A1 * | 10/2015 | Vasiliev | G02B 27/1006 | 136/257 |
| 2016/0054507 A1 * | 2/2016 | Hirayama | G02B 6/0091 | 349/65 |
| 2016/0054508 A1 * | 2/2016 | Hirayama | G02B 6/0055 | 349/65 |
| 2016/0334562 A1 | 11/2016 | Richards | | |

* cited by examiner

LIGHT WAVE-GUIDE OPTICAL ELEMENT AND METHOD FOR FORMING THE SAME

BACKGROUND OF THE INVENTION

1. Field of the Invention

The present invention generally relates to a light wave-guide optical element and a method to form a light wave-guide optical element. In particular, the present invention is directed to a light wave-guide optical element with multiple bulging tips surrounded by a periphery plane and a method to form the light wave-guide optical element for use in a head-mounted display (HMD) or in a head-up display (HUD).

2. Description of the Prior Art

A head-mounted display (HMD) or a head-up display (HUD) is a small display which is able to create relatively large fields of view. These displays present data without requiring users to look away from their usual viewpoints. For example, a head-up display is a digital transparent image that is projected onto the windshield of a car, displaying the same information you would get from the dashboard. Alternatively, a head-mounted display is a display device which is worn on the head or as part of a helmet and has a small display optic in front of one eye (monocular HMD) or each eye (binocular HMD). Both head-mounted display and head-up display need a light wave-guide optical element to transmit digital images into the eye(s) of the viewer.

SUMMARY OF THE INVENTION

In the light of the above, the present invention accordingly proposes a light wave-guide optical element with a simplified bulging stack structure and a simplified method to form the light wave-guide optical element to pursue a compact head-mounted display or a head-up display with better industrial utility.

The present invention in a first aspect proposes a novel light wave-guide optical element for use in a head-mounted display (HMD) or in a head-up display (HUD). The light wave-guide optical element includes an organic optical material, an anti-reflection stack and an organic optical cover. The organic optical material includes a periphery plane and multiple bulging tips surrounded by the periphery plane. The anti-reflection stack conformally covers the bulging tips and the periphery plane. The organic optical cover correspondingly covers the anti-reflection stack, the periphery plane and the bulging tips.

In one embodiment of the present invention, the organic optical material and the organic optical cover are independently selected from an optically transparent material group consisting of an acrylic material and an epoxy material.

In another embodiment of the present invention, the anti-reflection stack includes at least one layer of zirconium oxide and silicon oxide. Preferably, the anti-reflection stack includes alternate layers of zirconium oxide and silicon oxide.

In another embodiment of the present invention, each bulging tip has an aspect ratio from 1:1 to 1:3.5.

In another embodiment of the present invention, each bulging tip has a geometric structure selected from a group consisting of triangle, rectangle, trapezoid and parallelogram.

In another embodiment of the present invention, the organic optical cover has a residue thickness from 0.5 µm to 60 µm.

In another embodiment of the present invention, the light wave-guide optical element further includes a top glass sheet to cover the organic optical cover.

In another embodiment of the present invention, the light wave-guide optical element further includes a bottom optically transparent carrier in direct contact with the organic optical material to support the organic optical material.

The present invention in a second aspect proposes a novel method to form a light wave-guide optical element. First, a flat organic optical layer is formed on an optically transparent substrate. Second, a template is used to transfer a pattern onto the flat organic optical layer to obtain a patterned organic optical layer. Subsequently, the patterned organic optical layer is cured in the presence of the template to obtain an organic optical material which is disposed on the optically transparent substrate. Then, the template is removed from the organic optical material. Later, an anti-reflection stack is formed to conformally cover the organic optical material. Afterwards, an organic optical cover layer is applied on the anti-reflection stack to cover the anti-reflection stack.

In one embodiment of the present invention, the method to form a light wave-guide optical element further includes the following steps. First, a molding step is carried out to place a top glass sheet to cover the organic optical cover layer in the presence of a mold. Then, the organic optical cover layer is cured in the presence of the top glass sheet to obtain an organic optical cover.

In another embodiment of the present invention, the method to form a light wave-guide optical element further includes to remove the top glass sheet from the organic optical cover.

In another embodiment of the present invention, the method to form a light wave-guide optical element further includes to remove the optically transparent substrate from the organic optical material.

In another embodiment of the present invention, the method to form a light wave-guide optical element further includes to stack one light wave-guide optical element on another light wave-guide optical element to obtain a light wave-guide optical stack.

In another embodiment of the present invention, the organic optical material and the organic optical cover are independently selected from an optically transparent group consisting of an acrylic material and an epoxy material.

In another embodiment of the present invention, the anti-reflection stack includes at least one layer of zirconium oxide or silicon oxide. Preferably, the anti-reflection stack includes alternate layers of zirconium oxide and silicon oxide.

In another embodiment of the present invention, the organic optical material includes a periphery plane and multiple bulging tips surrounded by the periphery plane.

In another embodiment of the present invention, each bulging tip has an aspect ratio from 1:1 to 1:3.5.

In another embodiment of the present invention, each bulging tip has a geometric structure selected from a group consisting of triangle, rectangle, trapezoid and parallelogram.

In another embodiment of the present invention, the organic optical cover has a residue thickness from 0.5 µm to 60 µm.

The present invention in a third aspect proposes a method to form a light wave-guide optical element. First, an anti-reflection stack is formed to conformally cover a patterned organic optical material including a periphery plane and multiple bulging tips surrounded by the periphery plane. Then, an organic optical cover layer is applied on the anti-reflection stack to cover the anti-reflection stack.

In one embodiment of the present invention, the method to form a light wave-guide optical element further includes the following steps. First, a molding step is carried out to cover the organic optical cover layer with a top glass sheet in the presence of a mold. Then, the organic optical cover layer is cured in the presence of the top glass sheet to obtain an organic optical cover.

In one embodiment of the present invention, the method to form a light wave-guide optical element further includes to remove the mold from the top glass sheet to obtain a light wave-guide optical element.

In one embodiment of the present invention, the method to form a light wave-guide optical element further includes to remove the mold and the top glass sheet from the organic optical cover to obtain a light wave-guide optical element.

In one embodiment of the present invention, the patterned organic optical material and the organic optical cover are independently selected from an optically transparent group consisting of an acrylic material and an epoxy material.

In another embodiment of the present invention, the anti-reflection stack includes at least one layer of zirconium oxide or silicon oxide. Preferably, the anti-reflection stack includes alternate layers of zirconium oxide and silicon oxide.

In another embodiment of the present invention, each bulging tip has a geometric structure selected from a group consisting of triangle, rectangle, trapezoid and parallelogram.

In one embodiment of the present invention, the organic optical cover has a residue thickness from 0.5 μm to 60 μm.

These and other objectives of the present invention will no doubt become obvious to those of ordinary skill in the art after reading the following detailed description of the preferred embodiment that is illustrated in the various figures and drawings.

DETAILED DESCRIPTION

The present invention provides novel methods to form a light wave-guide optical element. The novel methods make the procedures to form a light wave-guide optical element simpler and easier. The methods to form a light wave-guide optical element may start in the presence of a flat organic optical layer or in the presence of a pre-patterned organic optical material.

Figure 1:
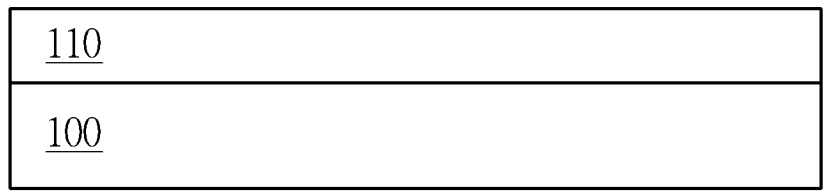
FIG. 1 to FIG. 15 illustrates one method to form a light wave-guide optical element of the present invention to start from a flat organic optical layer.

In a first aspect, the method to form a light wave-guide optical element may be carried out in the presence of a flat organic optical layer. FIG. 1 to FIG. 15 illustrates the method to form a light wave-guide optical element of the present invention to start from a flat organic optical layer. Please refer to FIG. 1, an optically transparent and flat substrate 100 is provided so a flat organic optical layer 110 may be formed on the optically transparent and flat substrate 100. The optically transparent and flat substrate 100, also known as a bottom optically transparent carrier, may be an organic material, such as an acrylic resin, or an inorganic material, such as glass. The thickness of the optically transparent and flat substrate 100 may be. If the optically transparent and flat substrate 100 is removed in a later step, the thickness of the optically transparent and flat substrate 100 is optional.

Alternatively, if the optically transparent and flat substrate 100 remains in the light wave-guide optical element, the thickness of the optically transparent and flat substrate 100 is preferably as small as possible. An organic optical liquid may be applied onto the optically transparent and flat substrate 100, such as by spin-coating or by imprinting, to form the flat organic optical layer 110. The flat organic optical layer 110 may be an optically transparent liquid, such as an acrylic material with a UV sensitive material or an epoxy material with a UV sensitive material to facilitate a later curing step.

Figure 2:
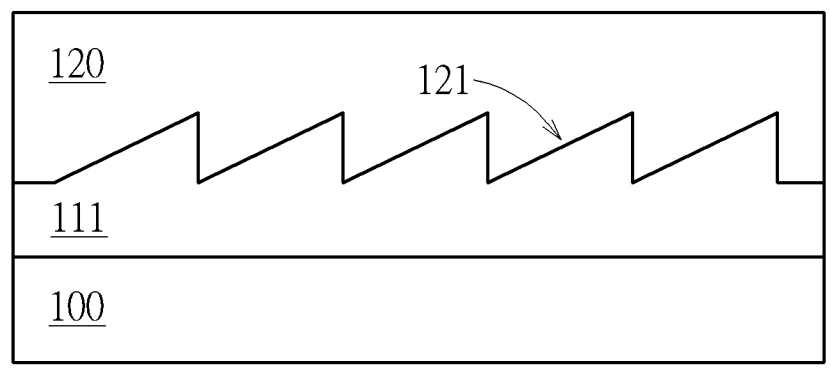

Second, please refer to FIG. 2, a template 120 is used to transfer a pattern 121 onto the surface of the flat organic optical layer 110. Please notice that the pattern 121 on the template 120 is complementary to the patterns to be defined on the surface of the flat organic optical layer 110. After the transfer, a patterned organic optical layer 111 is obtained.

Figure 3:
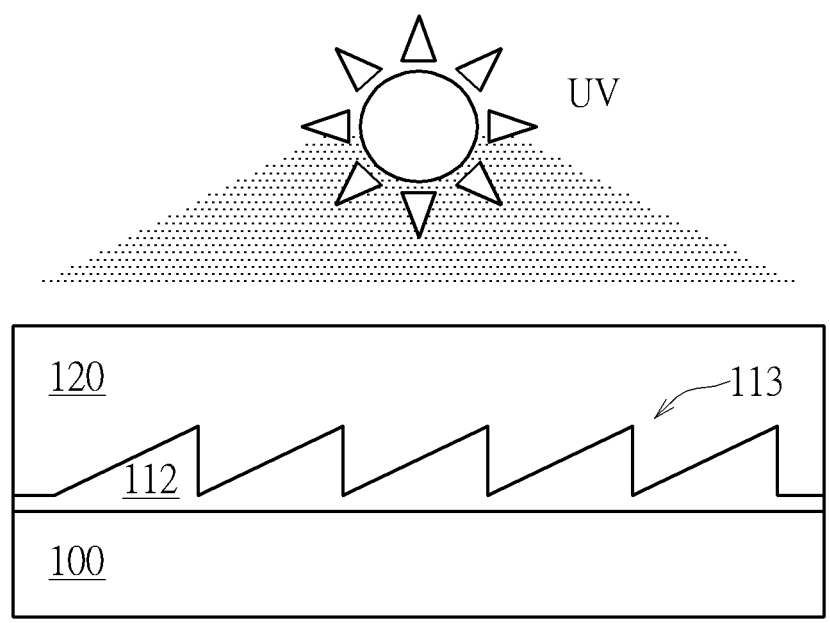

Later, please refer to FIG. 3, the patterned organic optical layer 111 is cured in the presence of the template 120 to obtain an organic optical material 112 with a pattern 113. The patterned organic optical layer 111 may be cured by UV light at an energy density from 0.5 J/cm²~3 J/cm². After the curing step, the pattern 113 is permanently fixed on the organic optical material 112.

Figure 4:
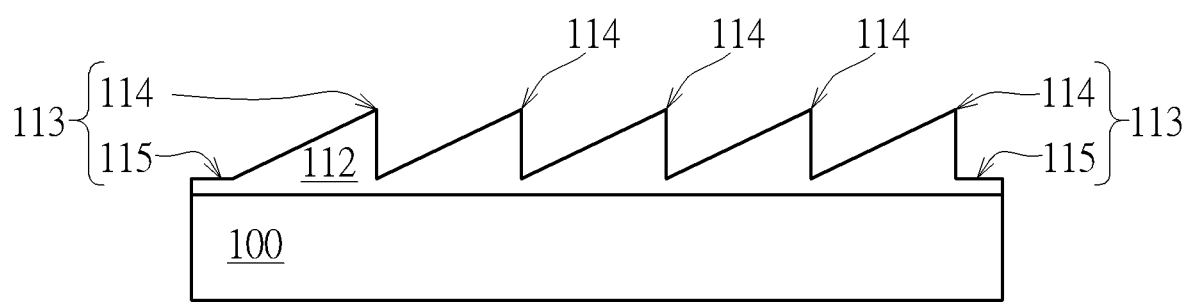

After the above curing step, please refer to FIG. 4, the template 120 is removed to obtain the organic optical material 112 disposed on the optically transparent substrate 100, also called a bottom optically transparent carrier. The organic optical material 112 has a pattern 113 defined by the template 120. In particular, the pattern 113 has a periphery plane 115 and multiple bulging tips 114 surrounded by the periphery plane 115. The periphery plane 115 and multiple bulging tips 114 together define the working region in a head-mounted display (HMD) or in a head-up display (HUD). Multiple bulging tips 114 define a viewing region of the working region to a user and the periphery plane 115 defines a periphery region of the working region.

Figure 5:
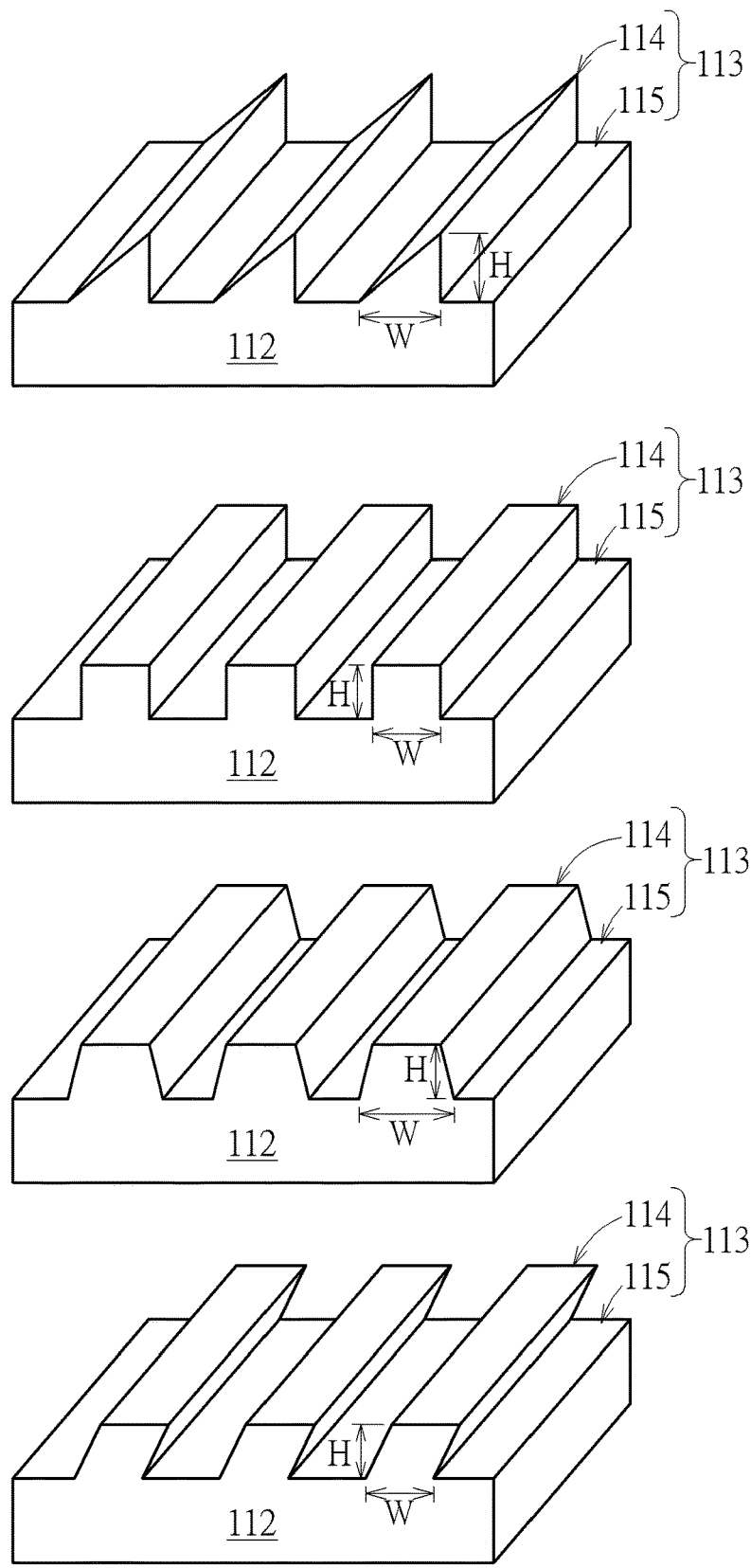

Each bulging tip 114 has a geometric structure, for example triangle, rectangle, trapezoid or parallelogram as shown in FIG. 5. Moreover, each bulging tip 114 has a height H and a width W. The aspect ratio of the bulging tip 114 (H/W) may be 1:1 to 1:3.5.

Figure 6:
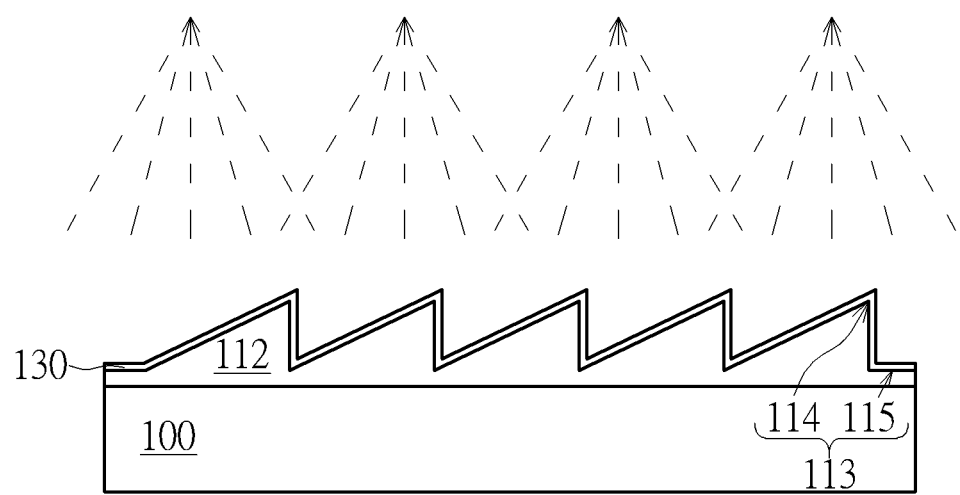
Figure 7:
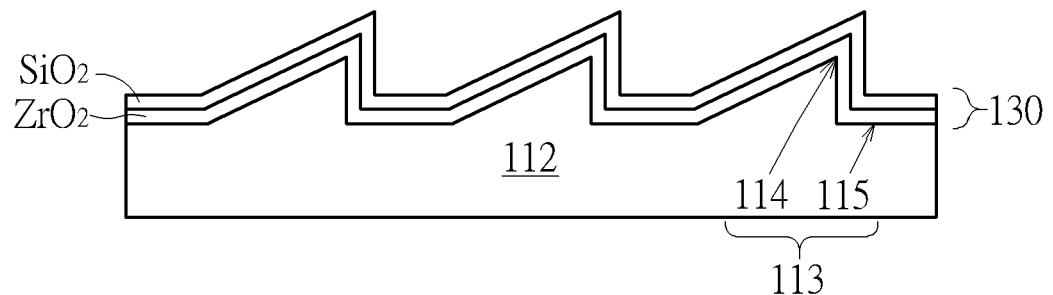
Figure 7:
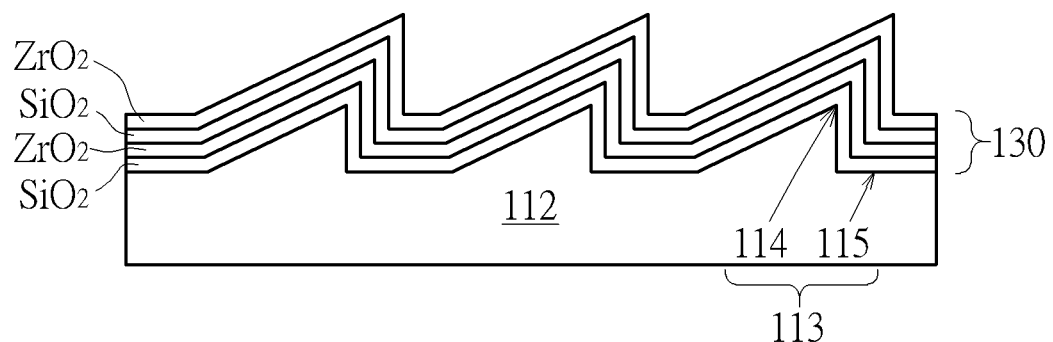

After the template 120 is removed from the organic optical material 112, an anti-reflection stack 130 is formed to conformally cover the pattern 113, namely the multiple bulging tips 114 and the periphery plane 115 of the organic optical material 112, as shown in FIG. 6. The triangle bulging tips 114 are illustrated in FIG. 6 as an example only. The anti-reflection stack 130 includes at least one layer of zirconium oxide or silicon oxide. Preferably, the anti-reflection stack 130 includes at least one layer of zirconium oxide and silicon oxide. More preferably, the anti-reflection stack 130 includes layers of zirconium oxide and silicon oxide in an alternate way, as shown in FIG. 7. The anti-reflection stack 130 may be formed by spray or by coating. The anti-reflection stack 130 helps.

Figure 8:
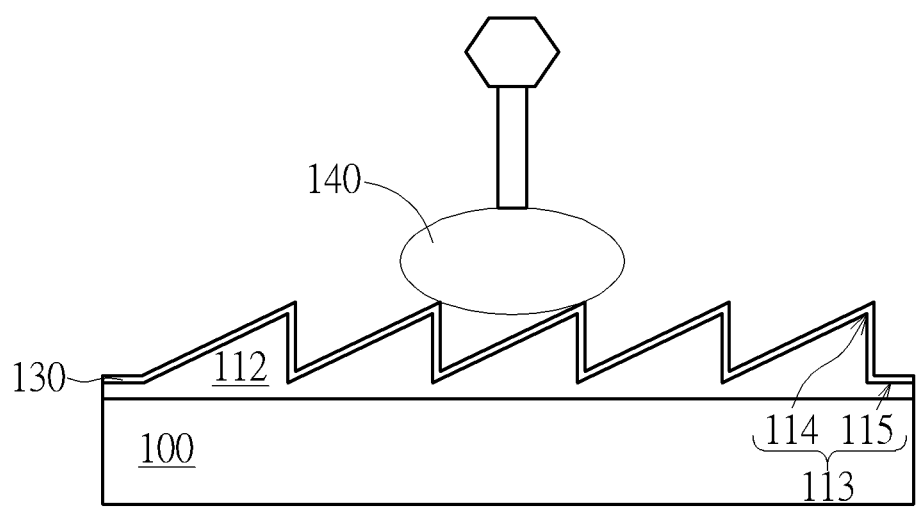

Afterwards, please refer to FIG. 8, an organic optical glue 140 is dispensed on the anti-reflection stack 130 to form an organic optical cover layer to cover the anti-reflection stack 130. The organic optical glue 140 may be an optically transparent glue, such as an acrylic material with a UV sensitive material or an epoxy material with a UV sensitive material to facilitate a later curing step. The organic optical glue 140 may be the same material as or a different material from the flat organic optical layer 110.

Figure 9:
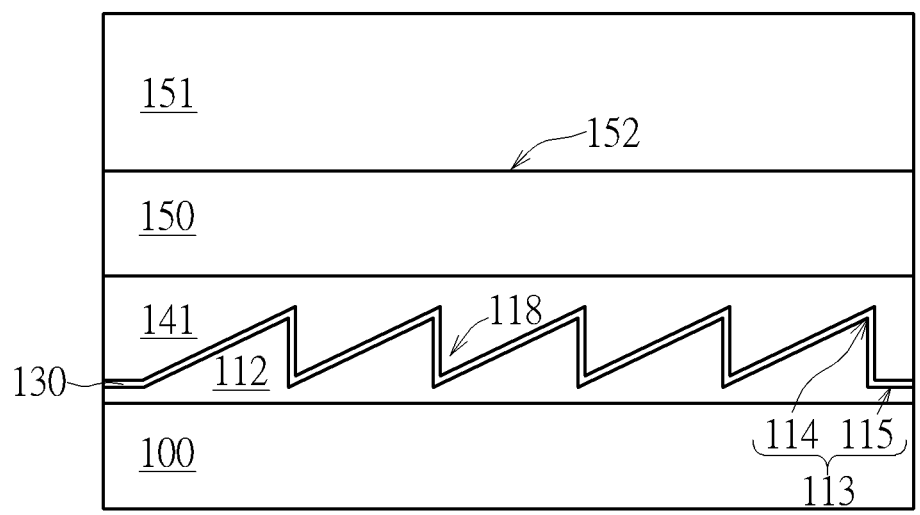

Subsequently, please refer to FIG. 9, another molding step is carried out to place a top glass sheet 150 to press the organic optical glue 140 in the presence of a mold 151 to obtain an organic optical cover layer 141 which was previously disposed on the pattern 113. In this step, the top glass sheet 150 is attached to the organic optical cover layer 141, and at the same time, the organic optical cover layer 141 fill the voids 118 among multiple bulging tips 114 and the periphery plane 115 so the organic optical cover layer 141 tightly fits the pattern 113. In particular, the mold 151 has a flat surface 152 so there is no pattern as a result transferred to the surface of the organic optical cover layer 141.

Figure 9A:
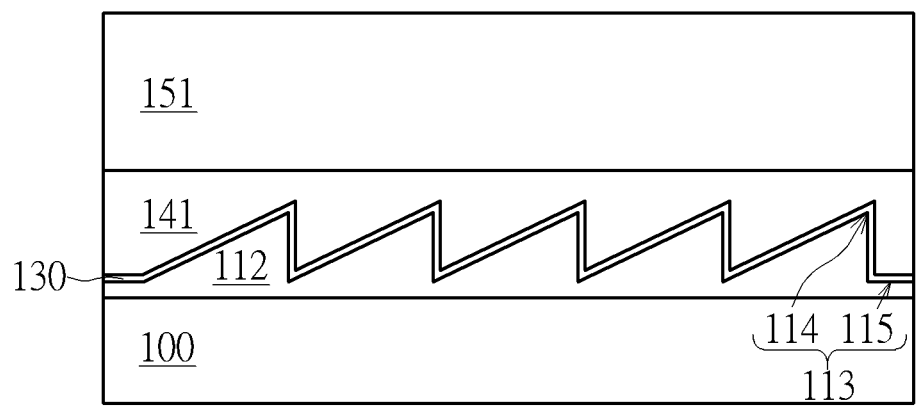
FIG. 9A illustrates a molding step is carried out in the absence of a top glass sheet to obtain an organic optical cover layer.

The thickness of the top glass sheet 150 is not critical. If the top glass sheet 150 is removed in a later step, the thickness of the top glass sheet 150 is optional. Alternatively, if the top glass sheet 150 is not removed in a later step, the thickness of the top glass sheet 150 is as small as possible. In another embodiment of the present invention, please refer to FIG. 9A, the molding step may be carried out in the absence of a top glass sheet to press the organic optical glue 140 in the presence of a mold 151 to obtain an organic optical cover layer 141 which is disposed on the pattern 113.

Figure 10:
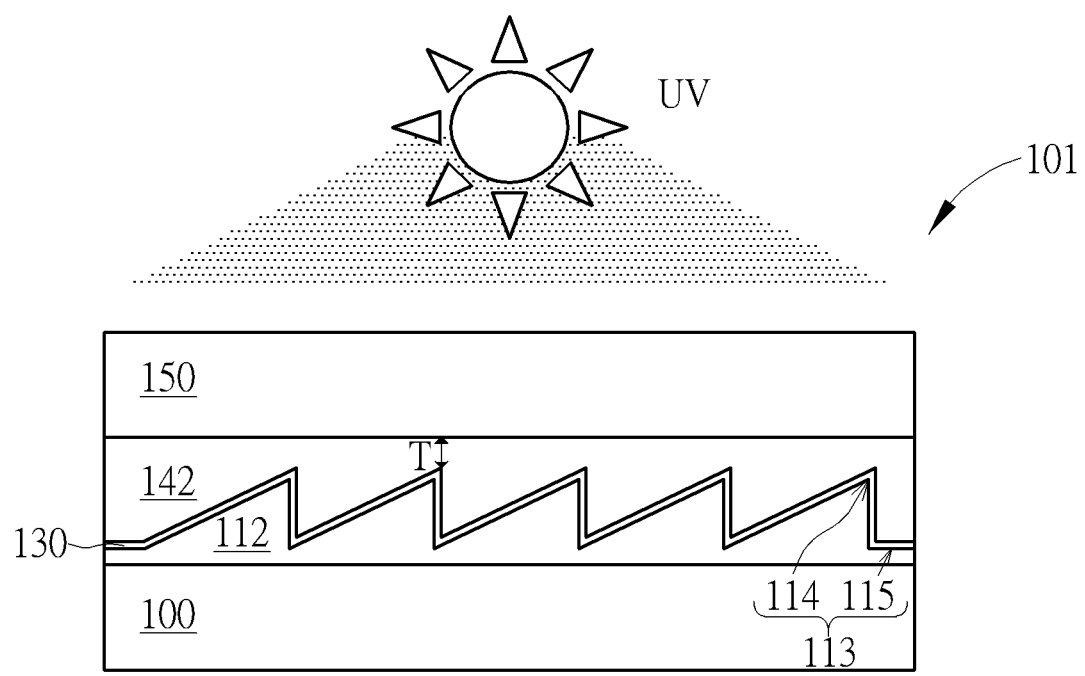
Figure 10A:
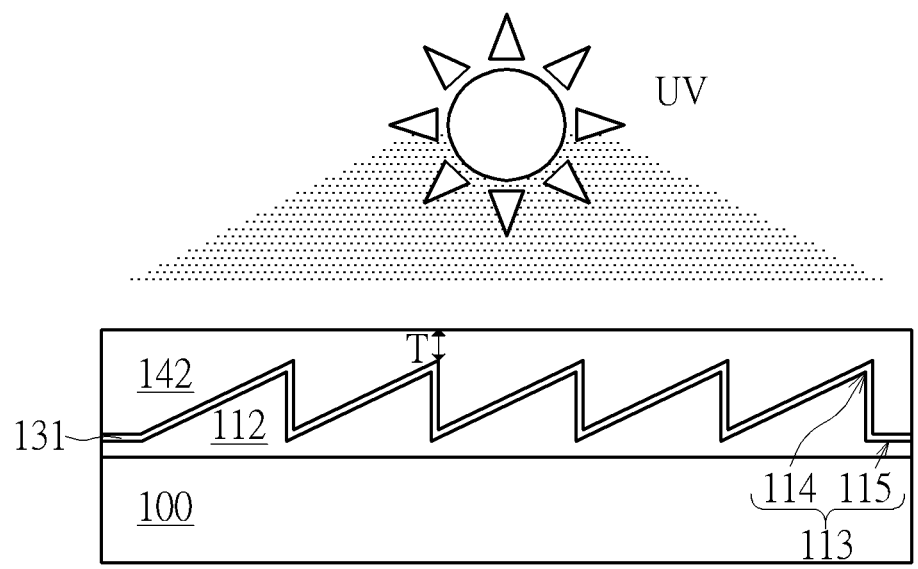
FIG. 10A illustrates the organic optical cover layer is cured in the absence of the top glass sheet to obtain an organic optical cover.

Then, the organic optical cover layer 141 is cured in the presence of the top glass sheet 150 to obtain an organic optical cover 142, as shown in FIG. 10, or cured in the absence of the top glass sheet to obtain an organic optical cover 142, as shown in FIG. 10A. Because the organic optical cover layer 141 preferably has a UV sensitive material to facilitate the curing step, the organic optical cover layer 141 may be cured by UV light at an energy density from 0.5 J/cm$^2$~3 J/cm$^2$. The top glass sheet 150 is optically transparent to the UV light.

After the curing step, the mold 151 may be removed to obtain a light wave-guide optical element 101 with an optically transparent substrate 100, an organic optical material 112, an anti-reflection stack 130, an organic optical cover 142 and a top glass sheet 150. In another embodiment of the present invention, please refer to FIG. 12, the curing step may be carried out in the absence of a top glass sheet to obtain a light wave-guide optical element 103 with an optically transparent substrate 100, an organic optical material 112, an anti-reflection stack 130 and an organic optical cover 142.

In particular, after the curing step, one bulging tip 114 to the surface of the organic optical cover 142 defines a residue thickness T. The residue thickness T depends on the viscosity of the organic optical glue 140 and on the total area of the substrate and helps ensure that every bulging tip 114 stays within the organic optical cover 142. The residue thickness preferably ranges from 0.51 μm to 60 μm. For example, 1) T=0.5 μm when the viscosity is 10 cps and the area is 50×50 mm$^2$, 2) T=40 μm when the viscosity is 1800 cps and the area is 8" wafer, or 3) T=60 μm when the viscosity is 5000 cps and the area is 8" wafer are given here as references.

Figure 11:
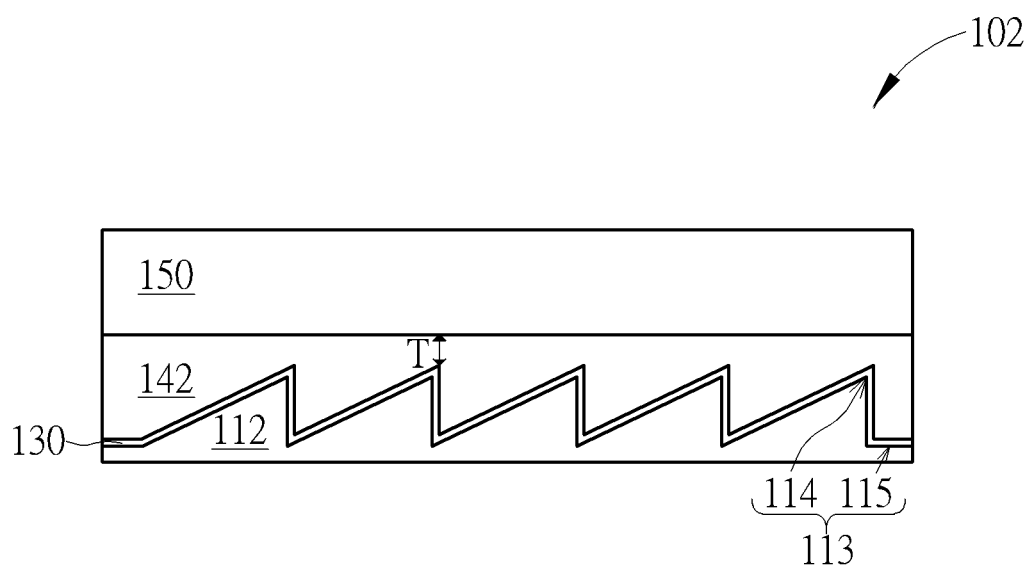
Figure 12:
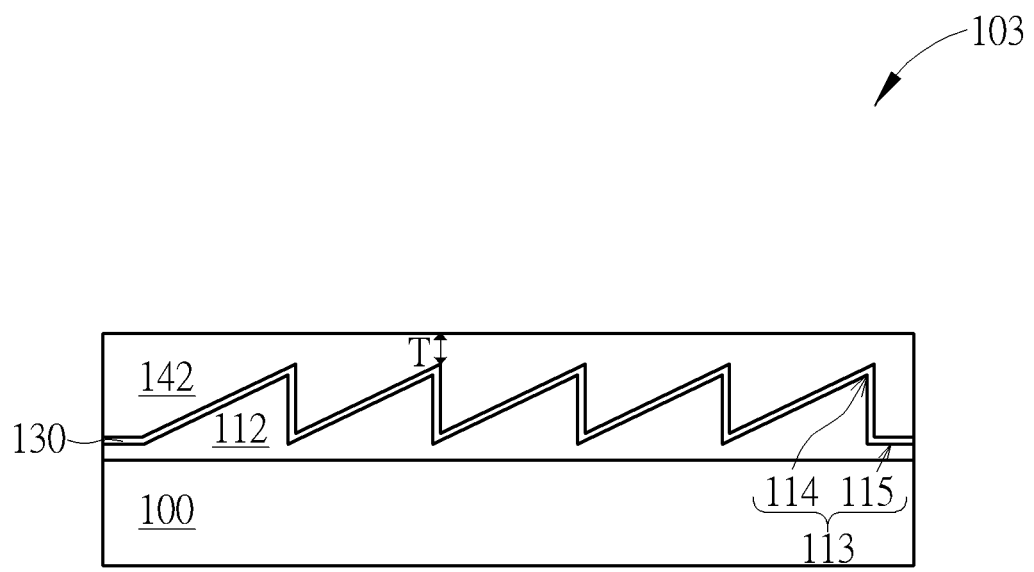
Figure 13:
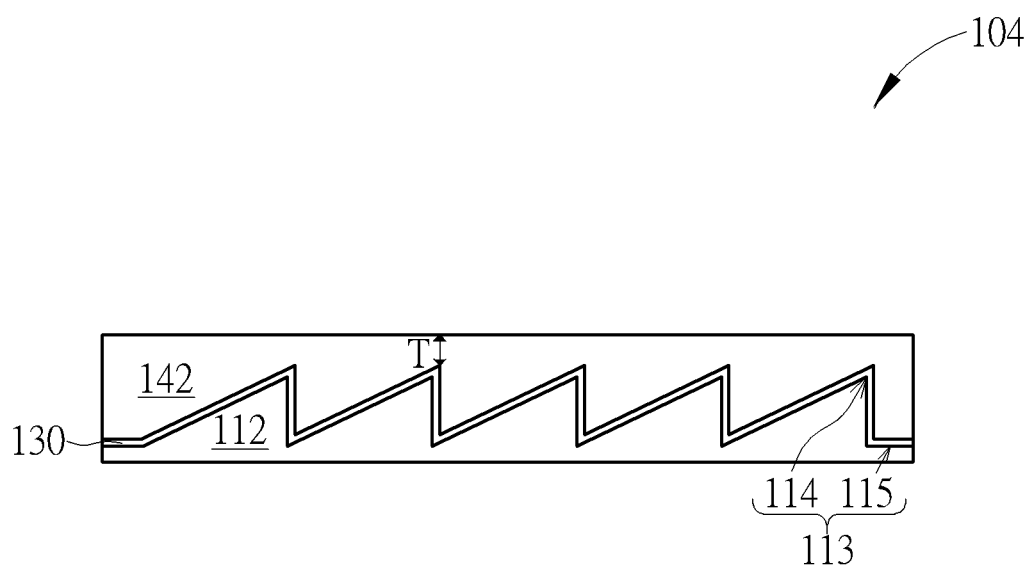

In one embodiment of the present invention, the optically transparent substrate 100 and/or the top glass sheet 150 may be optionally removed. For example, as shown in FIG. 11, the optically transparent substrate 100 may be optionally removed from the organic optical material 112 to obtain a light wave-guide optical element 102. Alternatively, as shown in FIG. 12, the top glass sheet 150 may be optionally removed to obtain a light wave-guide optical element 103. Or, as shown in FIG. 13, both the optically transparent substrate 100 and the top glass sheet 150 are removed to obtain a light wave-guide optical element 104 with an organic optical material 112, an anti-reflection stack 130 and an organic optical cover 142.

Figure 14:
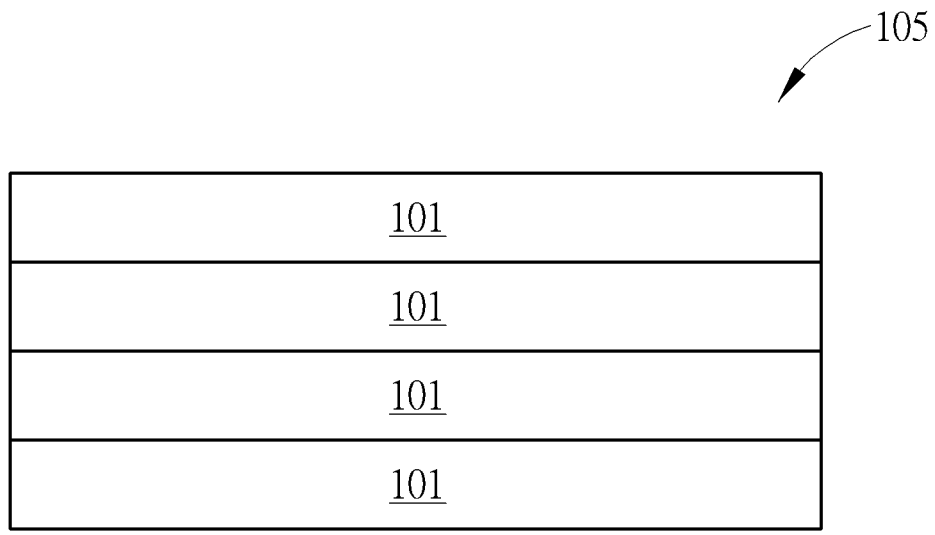
Figure 14:
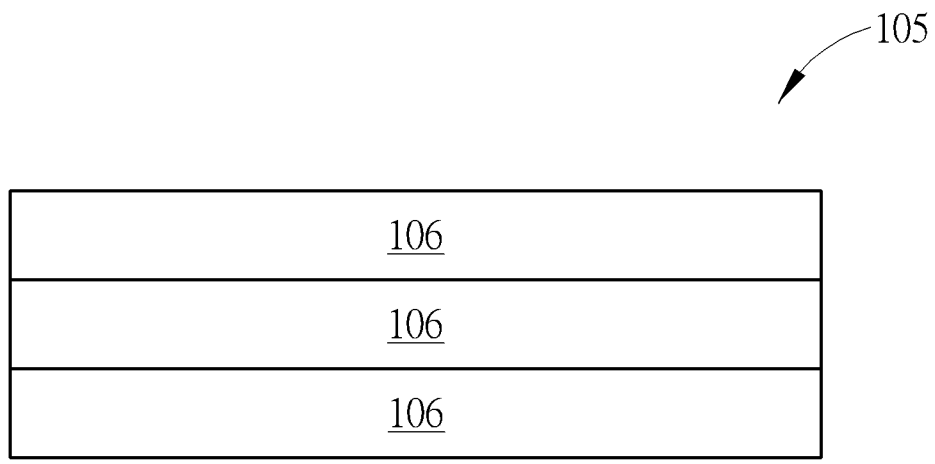
Figure 15:
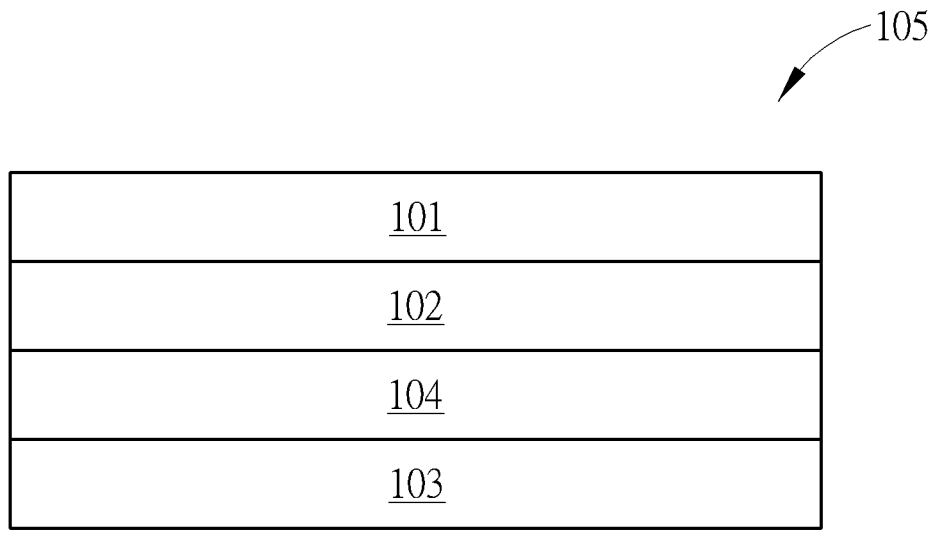
Figure 15:
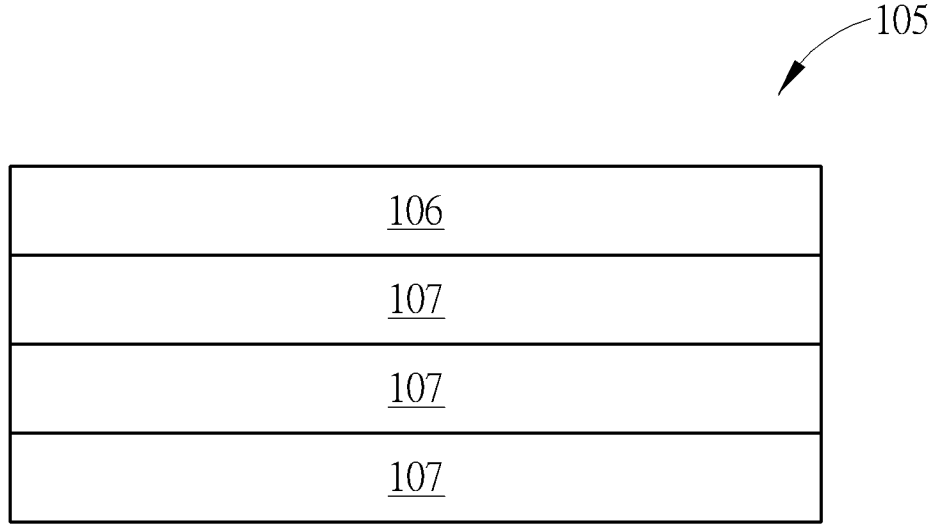

In another embodiment of the present invention, one light wave-guide optical element 101, 102, 103 or 104 may be stacked on another light wave-guide optical element 101, 102, 103 or 104 to obtain a light wave-guide optical stack. The light wave-guide optical stack 105 may consist of the same light wave-guide optical elements, as shown in FIG. 14 or have different light wave-guide optical elements, as shown in FIG. 15.

Figure 16:
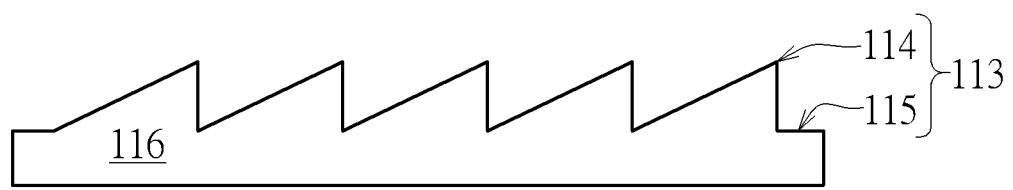
FIG. 16 to FIG. 21 illustrates another method to form a light wave-guide optical element of the present invention to start from a pre-patterned organic optical layer.

In a second aspect, the present invention provides another method to form a light wave-guide optical element in the absence of the previously mentioned optically transparent substrate 100 in the beginning. FIG. 16 to FIG. 21 illustrates another method to form a light wave-guide optical element of the present invention to start from a patterned organic optical substrate. First, as shown in FIG. 16, a patterned organic optical substrate 116 is provided. The patterned organic optical substrate 116 has a pre-formed pattern 113. The patterned organic optical substrate 116 may be similar to the previously mentioned organic optical material 112 in many aspects.

For example, the pattern 113 also has a periphery plane 115 and multiple bulging tips 114 surrounded by the periphery plane 115. The periphery plane 115 and multiple bulging tips 114 together define the working region in a head-mounted display (HMD) or in a head-up display (HUD). Multiple bulging tips 114 define a viewing region of the working region to a user and the periphery plane 115 defines a periphery region of the working region. Each bulging tip 114 has a geometric structure, for example triangle, rectangle, trapezoid or parallelogram as shown in FIG. 5. Moreover, each bulging tip 114 has a height H and a width W. The aspect ratio of the bulging tip 114 (H/W) may be 1:1 to 1:3.5.

Figure 17:
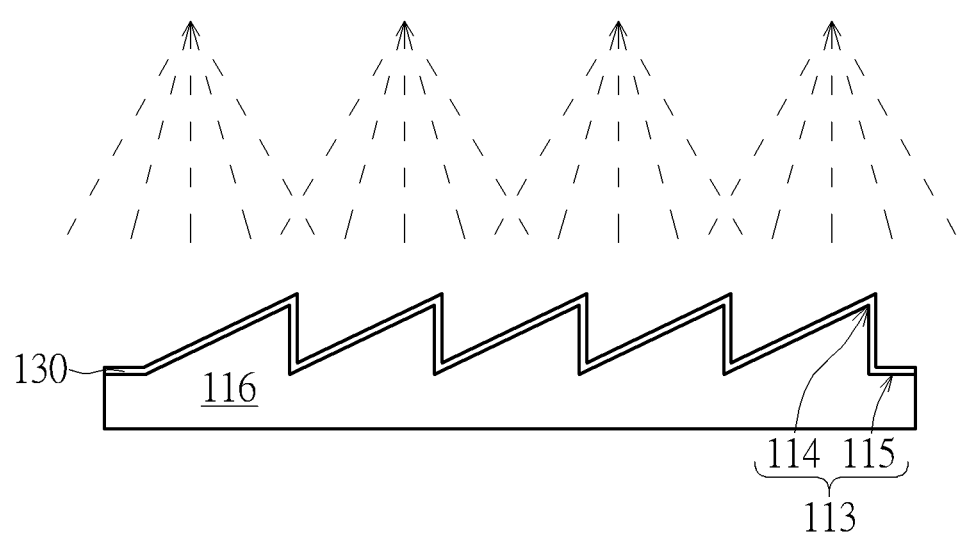

Second, as shown in FIG. 17, an anti-reflection stack 130 is formed to conformally cover the pattern 113, namely the multiple bulging tips 114 and the periphery plane 115 of the organic optical material 112. The anti-reflection stack 130 includes at least one layer of zirconium oxide or silicon oxide. Preferably, the anti-reflection stack 130 includes at least one layer of zirconium oxide and silicon oxide. More preferably, the anti-reflection stack 130 includes layers of zirconium oxide and silicon oxide in an alternate way, as shown in FIG. 7. The anti-reflection stack 130 may be formed by spray or by coating.

Figure 18:
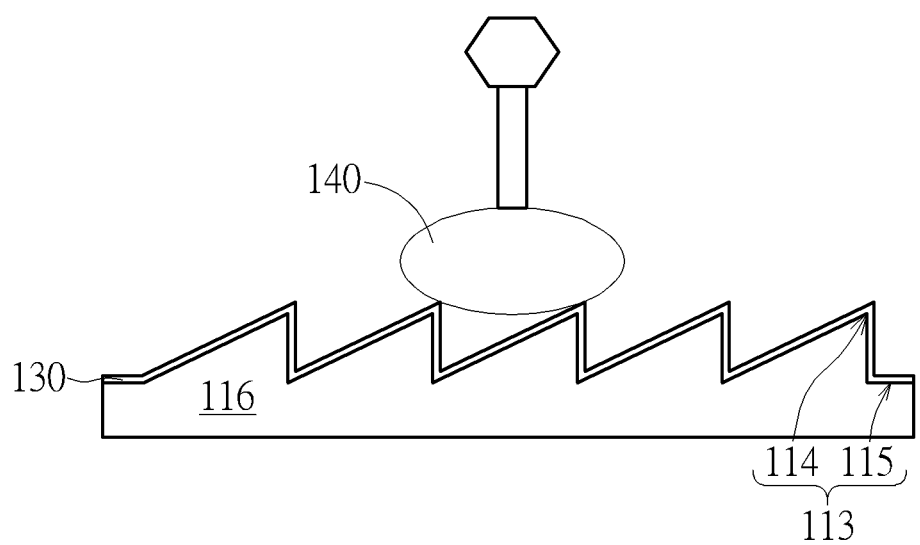

Afterwards, please refer to FIG. 18, an organic optical glue 140 is dispensed on the anti-reflection stack 130 to form an organic optical cover layer to cover the anti-reflection stack 130. The organic optical glue 140 may be an optically transparent glue, such as an acrylic material with a UV sensitive material or an epoxy material with a UV sensitive material to facilitate a later curing step. The organic optical glue 140 may be the same material as or a different material from the patterned organic optical substrate 116.

Figure 19:
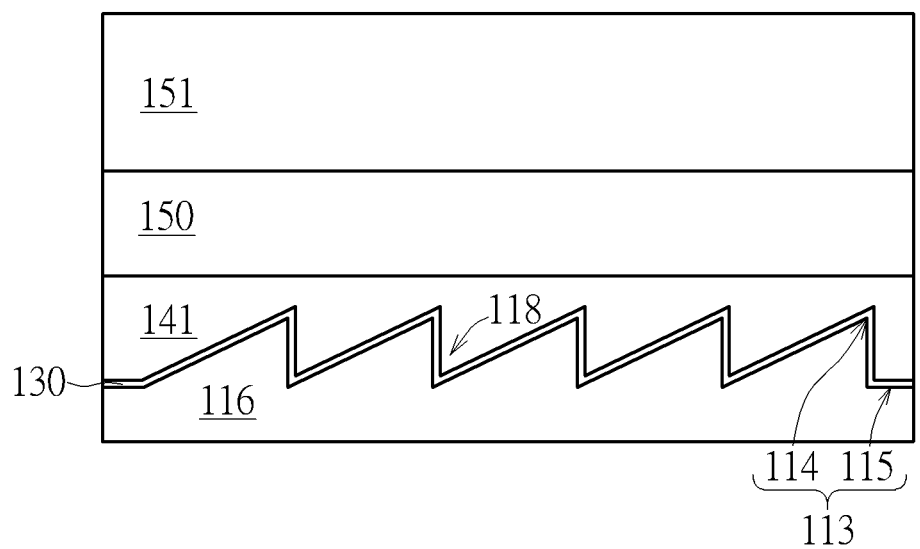

Subsequently, please refer to FIG. 19, a molding step is carried out to place a top glass sheet 150 to press the organic optical glue 140 in the presence of a mold 151 to obtain an organic optical cover layer 141 disposed on the pattern 113. In this step, the top glass sheet 150 is attached to the organic optical cover layer 141, and at the same time, the organic optical cover layer 141 fills the voids 118 among multiple bulging tips 114 and the periphery plane 115 so the organic optical cover layer 141 tightly fits the pattern 113. In particular, the mold 151 has a flat surface so there is no pattern as a result transferred to the surface of the organic optical cover layer 141.

The thickness of the top glass sheet 150 is not critical. If the top glass sheet 150 is removed in a later step, the thickness of the top glass sheet 150 is optional. Alternatively, if the top glass sheet 150 is not removed in a later step, the thickness of the top glass sheet 150 is as small as possible.

Figure 20:
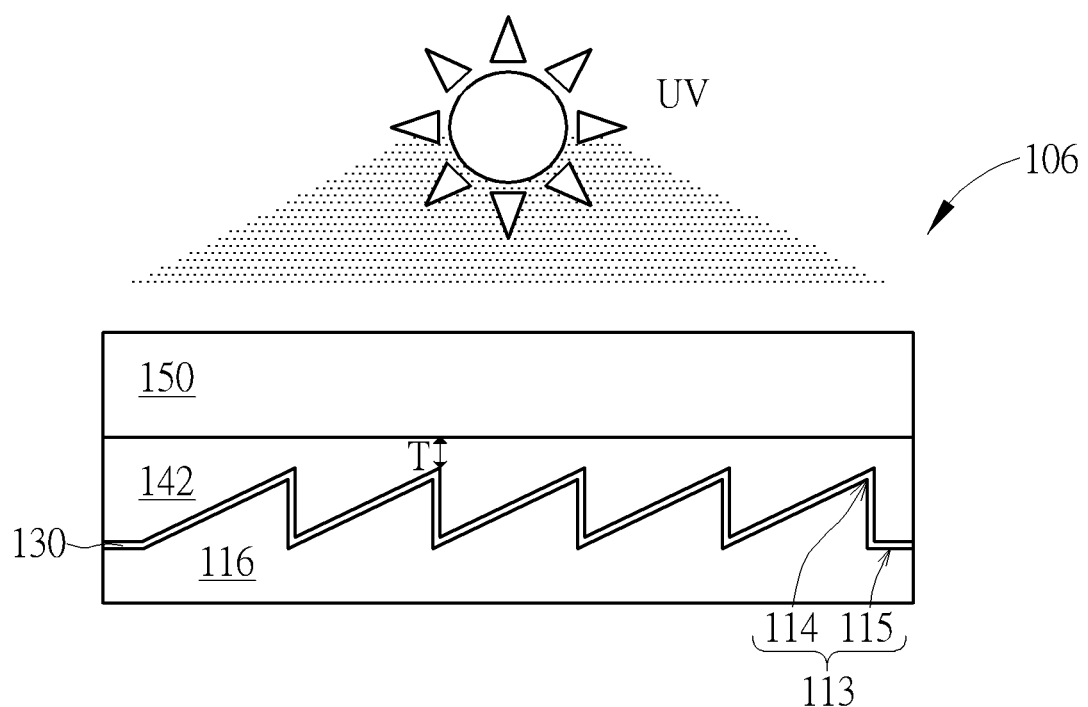
Figure 21:
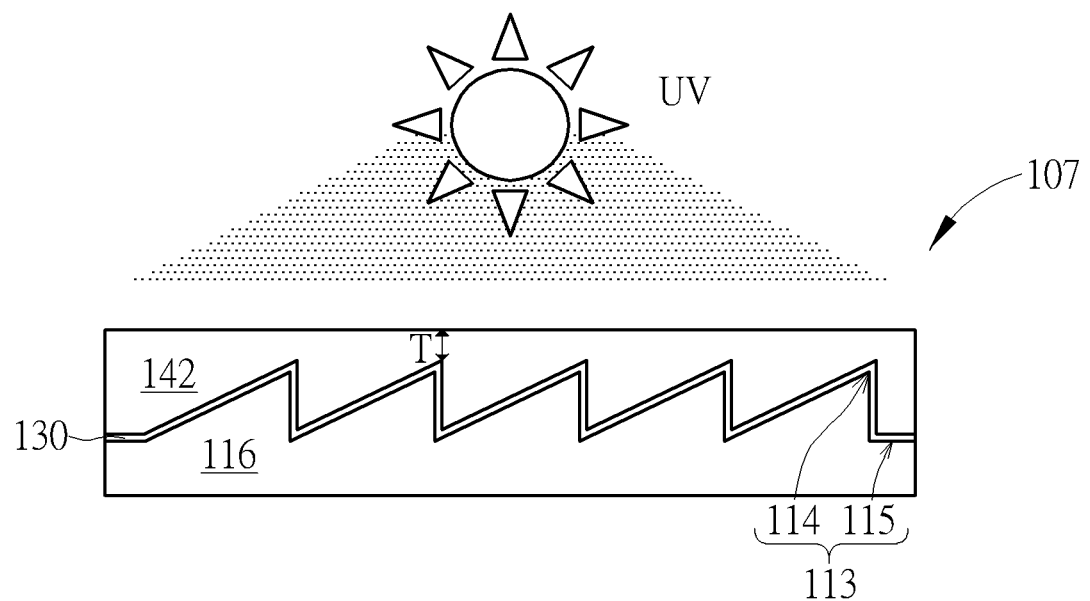

Then, as shown in FIG. 20, the organic optical cover layer 141 is cured in the presence of the top glass sheet 150 to obtain an organic optical cover 142, or as shown in FIG. 21, the organic optical cover layer 141 is cured in the absence of the top glass sheet 150 to obtain an organic optical cover 142. Because the organic optical cover layer 141 preferably has a UV sensitive material to facilitate the curing step, the organic optical cover layer 141 may be cured by UV light at an energy density from $0.5$ J/cm$^2$~$3$ J/cm$^2$. The top glass sheet 150 is optically transparent to the UV light.

After the curing step, the mold 151 may be removed to obtain a light wave-guide optical element 106 with a patterned organic optical substrate 116, an anti-reflection stack 130, an organic optical cover 142 and a top glass sheet 150.

In one embodiment of the present invention, the top glass sheet 150 may be further optionally removed. For example, as shown in FIG. 21, the top glass sheet 150 may be optionally removed from the organic optical cover 142 to obtain a light wave-guide optical element 107 with a patterned organic optical substrate 116, an anti-reflection stack 130 and an organic optical cover 142.

In particular, after the curing step, one bulging tip 114 to the surface of the organic optical cover 142 defines a residue thickness T. The residue thickness T depends on the viscosity of the organic optical glue 140 and on the total area of the substrate and helps ensure that every bulging tip 114 stays within the organic optical cover 142. The residue thickness preferably ranges from 0.5 µm to 60 µm. For example, 1) T=0.5 µm when the viscosity is 10 cps and the area is 50×50 mm$^2$, 2) T=40 µm when the viscosity is 1800 cps and the area is 8" wafer, or 3) T=60 µm when the viscosity is 5000 cps and the area is 8" wafer are given here as references.

In another embodiment of the present invention, one light wave-guide optical element 106 or 107 may be stacked on another light wave-guide optical element 106 or 107 to obtain a light wave-guide optical stack 105. The light wave-guide optical stack 105 with the light wave-guide optical elements 106 and/or 107 is similar to the light wave-guide optical stack 105. Please refer to the above descriptions regarding the light wave-guide optical stack 105 for details.

After the above steps, a light wave-guide optical element 101, 102, 103, 104, 106 or 107 is obtained. The light wave-guide optical element includes a bottom optically transparent carrier, also called an optional optically transparent substrate 100, an organic optical material 112, an anti-reflection stack 130, an organic optical cover 142 and an optional top glass sheet 150.

The organic optical material 112 includes a periphery plane 115 and multiple bulging tips 114. The multiple bulging tips 114 are surrounded by the periphery plane 115. The periphery plane 115 and multiple bulging tips 114 together define the working region in a head-mounted display (HMD) or in a head-up display (HUD). Multiple bulging tips 114 define a viewing region of the working region to a user and the periphery plane 115 defines a periphery region of the working region. Each bulging tip 114 has a geometric structure, for example triangle, rectangle, trapezoid or parallelogram as shown in FIG. 5. Moreover, each bulging tip 114 has a height H and a width W. The aspect ratio of the bulging tip 114 (H/W) may be 1:1 to 1:3.5.

The anti-reflection stack 130 conformally covers the bulging tips 114. The anti-reflection stack 130 includes at least one layer of zirconium oxide or silicon oxide. Preferably, the anti-reflection stack 130 includes at least one layer of zirconium oxide or silicon oxide. For example, the anti-reflection stack 130 may include 2, 21 or 101 layers of zirconium oxide and silicon oxide in total.

The organic optical cover 142 correspondingly covers the anti-reflection stack 130 and the bulging tips 114 so the anti-reflection stack 130 is sandwiched between the organic optical cover 142 and the bulging tips 114. The organic optical cover 142 may be the same material as or different material from the flat organic optical layer 110.

The bottom optically transparent carrier may be an organic material, such as an acrylic resin or an inorganic material, such as glass. The thickness of the bottom optically transparent carrier is not critical. If the bottom optically transparent carrier is present, the thickness of the bottom optically transparent carrier may be as small as possible. Similarly, if the top glass sheet 150 is present, the thickness of the top glass sheet 150 may be as small as possible.

One light wave-guide optical element 101, 102, 103, 104, 106 or 107 may be stacked on another light wave-guide optical element 101, 102, 103, 104, 106 or 107 to obtain a light wave-guide optical stack 105. The light wave-guide optical stack 105 may consist of the same light wave-guide optical elements, as shown in FIG. 14 or have different light wave-guide optical elements, as shown in FIG. 15. The light wave-guide optical element 103 is preferably placed at a bottom-most position due to the bottom optically transparent carrier 100. The light wave-guide optical element 102 and 106 are preferably placed at an up-most position due to top glass sheet 150. The light wave-guide optical element 104 and 107 are preferably placed in the middle of the light wave-guide optical stack 105 without the need of a protective layer to pursue a smaller total thickness of the light wave-guide optical stack 105. The light wave-guide optical element 101 is however versatile.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A light wave-guide optical element, comprising:
   an optically transparent organic optical material comprising a pattern, said pattern comprising:
     a periphery plane; and
     a plurality of bulging tips free of a particle and surrounded by said periphery plane;
   an anti-reflection stack to conformally cover said bulging tips; and
   an optically transparent organic optical cover to correspondingly cover said bulging tips, wherein a distance from one of said bulging tips to a surface of the optically transparent organic optical cover defines a residue thickness T in a range from 0.5 µm to 60 µm.

2. The light wave-guide optical element of claim 1, wherein said optically transparent organic optical material and said optically transparent organic optical cover are independently selected from an optically transparent group consisting of an acrylic material and an epoxy material.

3. The light wave-guide optical element of claim 1, wherein said anti-reflection stack includes at least one layer of zirconium oxide and silicon oxide.

4. The light wave-guide optical element of claim 1, wherein said bulging tips independently have an aspect ratio of 1:1-1:3.5.

5. The light wave-guide optical element of claim 1, wherein said bulging tips independently have a geometric structure selected from a group consisting of triangle, rectangle, trapezoid and parallelogram.

6. The light wave-guide optical element of claim 1, further comprising:
    a top glass sheet to cover said organic optical cover.

7. The light wave-guide optical element of claim 1, further comprising:
    a bottom optically transparent carrier in direct contact with said organic optical material to support said organic optical material.

* * * * *